United States Patent
Curtis et al.

(10) Patent No.: US 8,631,148 B2
(45) Date of Patent: Jan. 14, 2014

(54) METHOD OF PROVIDING PROXIMITY-BASED QUALITY FOR MULTIMEDIA CONTENT

(75) Inventors: Scott Curtis, Durham, NC (US); Alfredo Issa, Apex, NC (US); Greg Evans, Raleigh, NC (US); Richard Walsh, Raleigh, NC (US)

(73) Assignee: Lemi Technology, LLC, Wilmington, DE (US)

( * ) Notice: Subject to any disclaimer, the term of this patent is extended or adjusted under 35 U.S.C. 154(b) by 643 days.

(21) Appl. No.: 12/314,194

(22) Filed: Dec. 5, 2008

(65) Prior Publication Data

US 2010/0146091 A1    Jun. 10, 2010

(51) Int. Cl.
G06F 15/16    (2006.01)

(52) U.S. Cl.
USPC .......................... 709/232; 709/203

(58) Field of Classification Search
USPC .................. 709/231, 232, 203, 223
See application file for complete search history.

(56) References Cited

U.S. PATENT DOCUMENTS

| | | | |
|---|---|---|---|
| 7,206,568 B2 | 4/2007 | Sudit | |
| 7,412,325 B1 | 8/2008 | Tannenbaum et al. | |
| 7,684,815 B2 | 3/2010 | Counts et al. | |
| 2002/0051540 A1 | 5/2002 | Glick et al. | |
| 2003/0023578 A1* | 1/2003 | Durand et al. | 707/1 |
| 2003/0135608 A1 | 7/2003 | Bodin et al. | |
| 2003/0195808 A1 | 10/2003 | Brown et al. | |
| 2004/0193902 A1* | 9/2004 | Vogler et al. | 713/193 |
| 2005/0050027 A1 | 3/2005 | Yeh et al. | |
| 2005/0060350 A1 | 3/2005 | Baum et al. | |
| 2005/0221841 A1* | 10/2005 | Piccionelli et al. | 455/456.3 |
| 2006/0004631 A1 | 1/2006 | Roberts et al. | |
| 2006/0029040 A1* | 2/2006 | Sherman et al. | 370/352 |
| 2006/0059096 A1* | 3/2006 | Dublish et al. | 705/57 |
| 2006/0085419 A1 | 4/2006 | Rosen | |
| 2006/0218225 A1 | 9/2006 | Hee Voon et al. | |
| 2006/0240856 A1 | 10/2006 | Counts et al. | |
| 2006/0287813 A1 | 12/2006 | Quigley | |
| 2007/0079010 A1* | 4/2007 | Heredia et al. | 709/246 |
| 2007/0121843 A1 | 5/2007 | Atazky et al. | |
| 2007/0127423 A1 | 6/2007 | Ho | |
| 2007/0130153 A1 | 6/2007 | Nachman et al. | |
| 2007/0180496 A1* | 8/2007 | Fransdonk | 726/3 |
| 2007/0218864 A1* | 9/2007 | Toshida | 455/403 |
| 2008/0022003 A1 | 1/2008 | Alve | |
| 2008/0033809 A1 | 2/2008 | Black et al. | |
| 2008/0184317 A1* | 7/2008 | Khedouri et al. | 725/86 |
| 2008/0186962 A1* | 8/2008 | Sinha | 370/389 |
| 2008/0281507 A1 | 11/2008 | Bergman | |
| 2009/0012706 A1 | 1/2009 | Kim | |
| 2009/0157304 A1 | 6/2009 | Zhe et al. | |
| 2009/0196302 A1* | 8/2009 | Pastorino et al. | 370/401 |
| 2009/0259539 A1* | 10/2009 | Dawson et al. | 705/14 |
| 2009/0300688 A1* | 12/2009 | Karaoguz et al. | 725/62 |

(Continued)

OTHER PUBLICATIONS

Http://www.bluecasting.com/prodserv.html ; Filter Worldwide, United Kingdom.

(Continued)

*Primary Examiner* — Joshua Joo (57) ABSTRACT

A system and method for providing proximity-based quality for multimedia content, including: transmitting multimedia content, and intentionally controlling a quality level of a presentation of the multimedia content based on proximity of a user to a particular location.

50 Claims, 7 Drawing Sheets

(56) References Cited

U.S. PATENT DOCUMENTS

| | | | |
|---|---|---|---|
| 2009/0328087 A1* | 12/2009 | Higgins et al. | 725/10 |
| 2010/0017261 A1 | 1/2010 | Evans et al. | |
| 2010/0066599 A1 | 3/2010 | Liu et al. | |
| 2010/0070537 A1 | 3/2010 | Amidon et al. | |
| 2010/0082488 A1 | 4/2010 | Evans et al. | |
| 2010/0125410 A1 | 5/2010 | Hicks | |
| 2011/0004840 A1 | 1/2011 | Feinberg et al. | |
| 2011/0208831 A1 | 8/2011 | Ho et al. | |
| 2012/0066308 A1* | 3/2012 | Karaoguz et al. | 709/204 |
| 2012/0303455 A1* | 11/2012 | Busch | 705/14.57 |
| 2012/0330754 A1* | 12/2012 | Foladare et al. | 705/14.61 |
| 2013/0080252 A1* | 3/2013 | Glasgow | 705/14.55 |

OTHER PUBLICATIONS

Krumm, J. and Horvitz, E., "Predestination: Inferring Destinations from Partial Trajectories," UbiComp 2006, Sep. 17-21, 2006, Orange County, California, 18 pages.

Shanahan, Kevin P. and Freedman, Michael J., "Locality Prediction for Oblivious Clients," In Proc. of the International Workshop on Peer-to-Peer Systems (IPTPS), Feb. 24-25, 2005, Ithaca, New York, found at <http://cs.brown.edu/courses/cs296-2/papers/netmap.pdf>, 6 pages.

"3GPP," Wikipedia, at <http://en.wikipedia.org/wiki/3GPP>, as revised Mar. 27, 2008, printed Dec. 12, 2011, 1 page.

"4G," Wikipedia, at <//en.wikipedia.org/wiki/4G>, as revised Apr. 23, 2008, printed Dec. 12, 2011, 1 page.

"Digital rights management," at <http://en.wikipedia.org/wiki/Digital_rights_management>, includes information dating back to 1998, page last modified Apr. 16, 2011, printed Apr. 21, 2011, 21 pages.

"IPv6," Wikipedia, at <http://en.wikipedia.org/wiki/IPv6>, includes information that dates back to the early 1980s, page last modified Apr. 18, 2011, printed Apr. 21, 2011, 16 pages.

"Multicast," Wikipedia, at <http://en.wikipedia.org/wiki/Multicast>, includes information that dates back to 2005, page last modified Mar. 26, 2011, printed Apr. 21, 2011, 5 pages.

* cited by examiner

METHOD OF PROVIDING PROXIMITY-BASED QUALITY FOR MULTIMEDIA CONTENT

FIELD OF THE INVENTION

The present invention generally relates to a method of and a system for location-based digital rights management and, in particular, to a method of and a system for varying the quality level of a broadcast or multicast of media content to a user based on proximity to a location.

BACKGROUND OF THE INVENTION

In general, commercial enterprises often try to entice potential customers to come to their place of business by offering unique services tied to their physical, geographic location. For example, many cafes offer free WiFi access to their customers. Consistent with the present invention, a system is contemplated in which digital inducements are attenuated or degraded, based on proximity of a user to a particular location.

SUMMARY OF THE INVENTION

The present invention relates to a method of and a system for providing a proximity-based quality for multimedia content, wherein the quality level of the presentation of the multimedia content is intentionally controlled to act as a proximity-graduated inducement for nearby users/customers to come physically closer to a particular location such a commercial place of business.

According to one aspect of the present invention, either full access to the encrypted digital signal or degrading access to, for example, a media library is contemplated.

For example, to gain full access to the encrypted digital signal, users must actually enter the location of the place of business. More specifically, the signal is encrypted in such a way as to be more valuable to the user the closer the user is to the place of business. Accordingly, the further from the physical location of the place of business the user is, the more the signal is intentionally attenuated or degraded, in a variety of useful ways. Moreover, the forms of the particular signal attenuation are configurable by the publisher of the digital signal.

Thus, the present invention provides a method of providing proximity-based quality for multimedia content, comprising: transmitting multimedia content; and intentionally controlling a quality level of a presentation of the multimedia content based on proximity of a user to a particular location.

The present invention further provides a system for providing proximity-based quality for multimedia content, comprising: means for transmitting multimedia content; and means for intentionally controlling a quality level of a presentation of the multimedia content based on proximity of a user to a particular location.

The present invention still further provides a computer readable medium comprising software for instructing a system to: transmit multimedia content; and intentionally control a quality level of a presentation of the multimedia content based on proximity of a user to a particular location.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
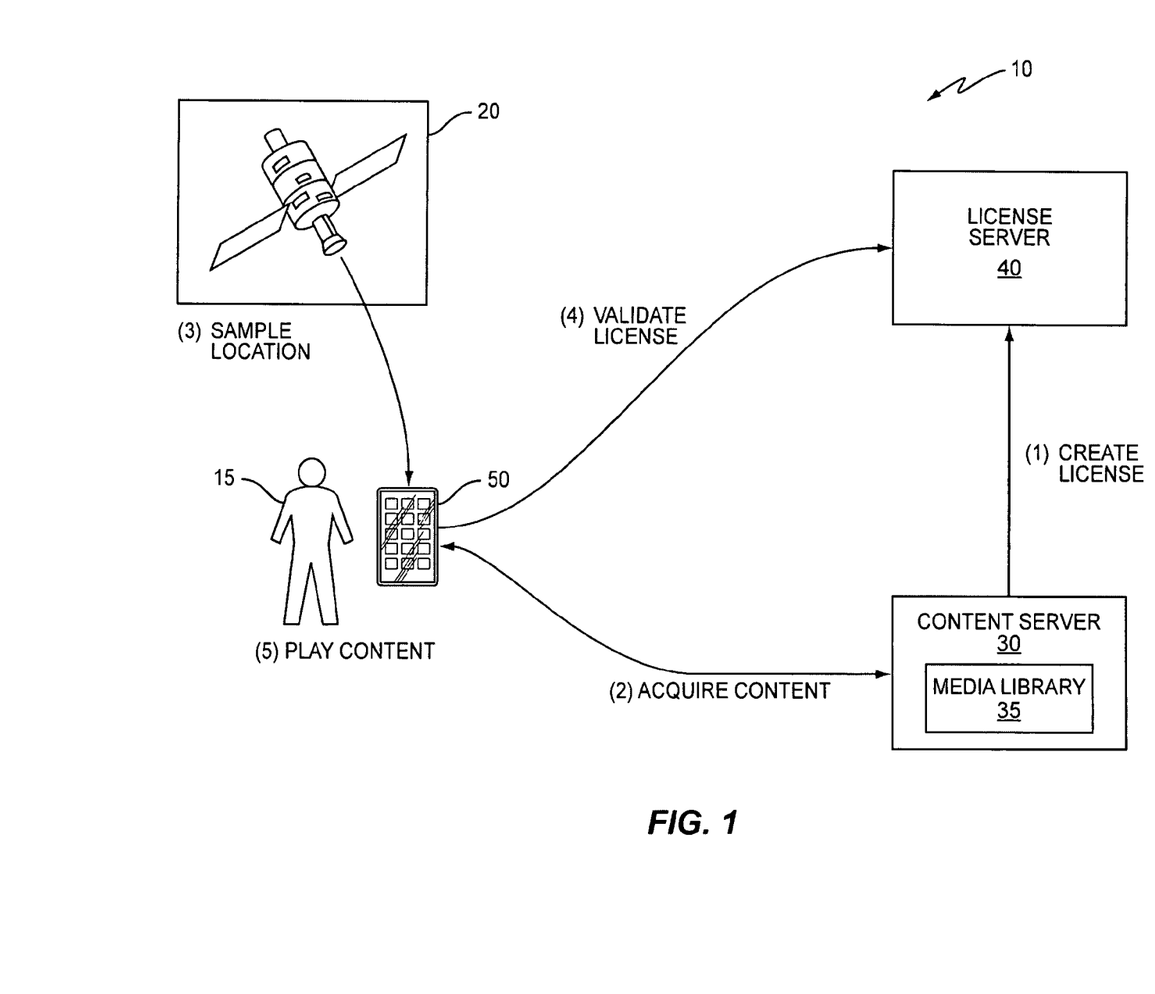
FIG. 1 illustrates a system for providing proximity-based quality for multimedia content according to an exemplary embodiment of the present invention.

FIG. 1 illustrates a system 10 for providing proximity encrypted signals according to an exemplary embodiment of the present invention. In particular, the system 10 includes a transmitter means 20 for transmitting multimedia content, for example, in the form of a digital signal from a sample location. The digital signal may be sent, for example, over a network such as a wireless network, but is not limited thereto. Alternatively, and as discussed in more detail below, an IPv6 type network environment could be utilized wherein the signal to users in a particular zone is a content stream wherein the content could be made available via a multicast stream, allowing multiple users access to the content without wasting limited wireless bandwidth.

The transmitter means 20 communicates with a content server 30 which includes, for example, a media library such as a music library 35. A user 15 may gain access to the content server 30 to obtain the signal using a mobile device 50. Access of the user's mobile device 50 to the content server 30 may be based on, for example, a license granted by a license server 40. The content server 30 and the license server 40 each may be implemented in software, hardware, or a combination thereof. The content server 30 comprises means for intentionally controlling the quality level of the presentation of the multimedia content based on proximity of a user 15 to a particular location.

By way of example, the sequence of events would be as follows: (1) a license is created and stored in the license server 40; (2) the user 15 having the mobile device 50 desires to acquire content from the content server 30, such as music from the music library 35; (3) the sample location such as a café transmits a digital signal from the transmitter means 20 in the form of music from the music library 35; (4) upon attempting to gain access, the license server 40 validates the user's 15 license to obtain the digital signal from the transmitter means 20 which originates the digital signal from the café; and (5) the user 15 is then able to play the content in the form of music over his mobile device 50. The amount of attenuation of that signal based on the user's 15 proximity to the origin of the digital signal (e.g., the café) and other factors will be discussed in more detail below.

The system 10, including the transmitter means 20, the content server 30, and the license server 40, allows the publisher or transmitter of a, for example, digital signal, a type of fine-grained control over the attenuation of the digital signal over proximity zones surrounding the signal origin. As indicated above, the signal origin may be a place of business, such as but not limited to a café. The proximity zones surrounding the signal origin will be discussed in more detail below with respect to FIG. 4.

Moreover, although the above embodiment describes the transmitter means 20 as being identified with or located at the place of origin such as a café, the present invention is not limited to such a configuration. In other words, the proximity zone where a user 15 has access to the full, unattenuated signal, such as a café, does not itself have to transmit a signal at all. For example, a signal "manager" can operate to tie all of the proximity zones to a particular location (e.g., a café) but not have the means to transmit the signal(s) from that particular location itself. Moreover, the signal does not have to be provided by a wireless mechanism from the designated "full axis area", such as a WiFi node, but can be provided by a wireless mechanism, such as a Wi-Max or long-term-evolution (LTE) which is not located at the location of origin such as the café. In this exemplary embodiment, a site can manage a proximity-attenuated signal without actually transmitting anything from the location itself.

Another example of a scenario where the center of the proximity zones and the signal origin are totally separate would be as follows: a coffee company such as CoffeeShop has multiple coffee shops or stores and sets up CoffeeShop.com as the signal source, with each of the individual coffee shops having proximity zones. The signal source (i.e., CoffeeShop.com) is provided location information such that the signal source can provide a mobile device 50 access to CoffeeShop.com content/stream based on proximity zone information of a specific CoffeeShop store.

Figure 2:
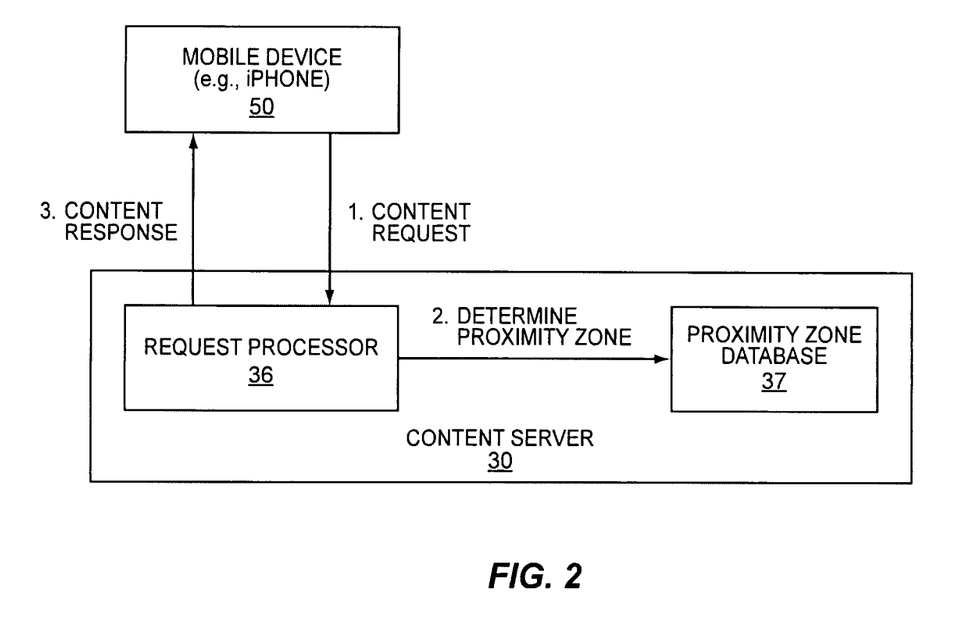
FIG. 2 illustrates the, high level process of a mobile device that requests content from a content server.

FIG. 2 illustrates, from the user's 15 perspective, the process of utilizing the mobile device 50, which may be a smart phone such as, for example, an iPhone®, to request content from the content server 30. For example, assuming that the user 15 has been granted access, the user 15 first makes (1) a content request to a request processor 36 of the content server 30. Then, (2) the content server 30 determines an appropriate proximity zone based on information in a proximity zone database 37. The content server 30 then (3) provides a content response to the mobile device 50.

The diagram illustrated in FIG. 2 is merely illustrative and those skilled in the art will recognize that there are many different possible variations in the basic flow that vary the type of content request/response, location identification method, and/or proximity zone determination.

The content request types include content stream, content playlist, content item, etc. For example, a content stream request may result in the content server 30 responding with a unicast stream directly to the user 15. Alternatively, the response may include a reference (url) and credentials (key, password, etc.) that allow the mobile device 50 to retrieve the content stream from another server.

Figure 4:
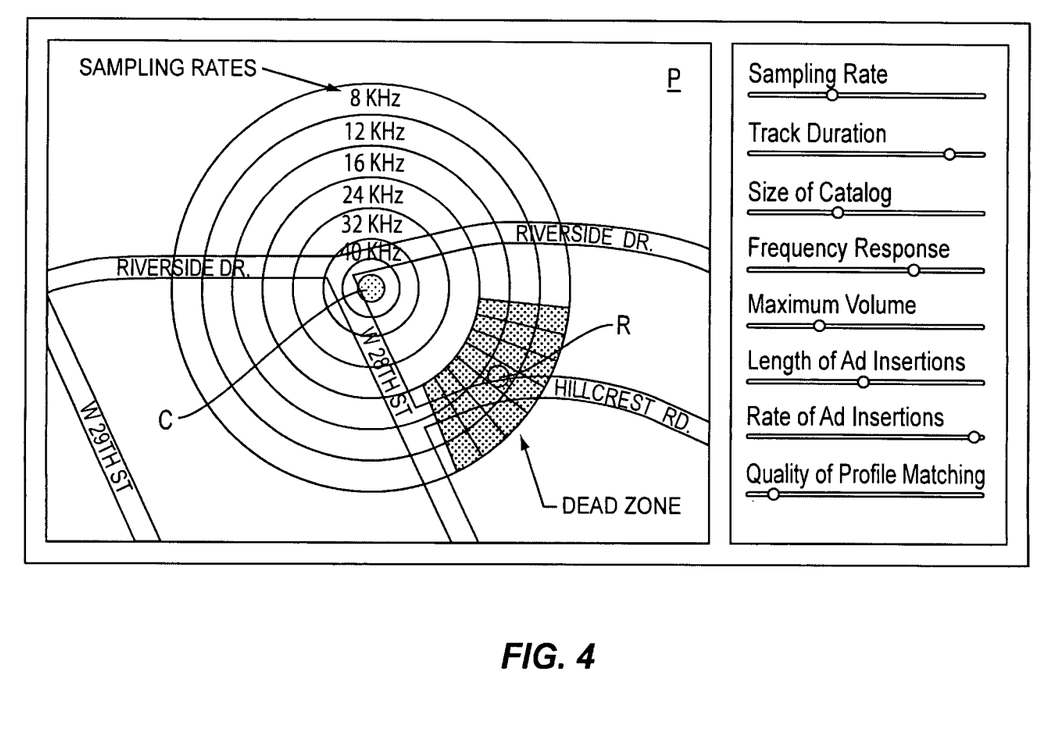
FIG. 4 illustrates an example of a proximity zone map surrounding a location which provides a signal with various settings for sampling rates being depicted.

As another example, a response to a content playlist request identifies a list of songs with references/credentials to retrieve those songs from various servers. Alternatively, the content server 30 may be aware of the content residing on the mobile device 50 and the playlist comprises that content. The content response may include additional information to assist the mobile device 50 and its user 15. For example, the mobile device 50 is provided with a list of all the proximity zone locations so that the mobile device 50 can show a user 15 something like the image or map that is shown in FIG. 4.

The proximity zone locations can be used by the mobile device 50 to determine when it needs to switch proximity zones. For example, in proximity zone A the user is listening to a low-quality country stream and as the mobile device 50 approaches proximity zone B it obtains and merges in the higher quality version of that stream.

The location identification methods include but are not limited to global positioning system (GPS) coordinates, wireless triangulation and so forth. The mobile device 50 may provide the location information to the content server 30, provide a location identifier that can be used to contact a third-party to retrieve location information, and/or the content server 30 triangulates the mobile device's 50 location.

The proximity zone determination is based on the location information, however, there may be one or more applicable proximity zones. A location may have one or more proximity zones or a proximity zone may have one or more configurations. The present invention contemplates using a number of different possible factors as discussed in more detail below, but one example is that three different proximity zones are applicable at a specific location: proximity zone A is a country music stream, proximity zone B is rock music stream, and proximity zone C is a jazz music stream. The selection may be based on a user 15 profile (e.g., the user 15 likes jazz), or subscriber level (unlimited music streaming), or current load (e.g., select the country multicast stream because an additional client will not adversely affect the server whereas the other two zones are unicast and would require more server resources).

As an alternative, the mobile device 50 may be provided the list of proximity zones and the user 15 can select which one. As yet another alternative, the content server 30 may personalize the proximity zone for each user 15. For example, the system 10 creates a low-quality stream for users 15 in the proximity zone and constructs the contents of the stream based on their content profile/preferences (e.g., user A gets a low quality country stream, user B gets a low quality rock stream).

As a still further alternative, the content received by all of the mobile devices 50 regardless of the proximity zone is the same. However, the mobile devices 50 are provided with instructions, based on the proximity zone in which they are located, that adjusts the content. For example, a mobile device A and a mobile device B both receive the same content stream. However, mobile device A is in a proximity zone 1 which is a high-quality zone and therefore the system 10 does not modify the content. On the other hand, a mobile device B is in a proximity zone 2 which is a low-quality zone such that the system 10 downgrades the content. The instructions could simply be a different set of rights expression language (REL)

which the digital rights management (DRM) component on the mobile device 15 enforces.

Figure 3:
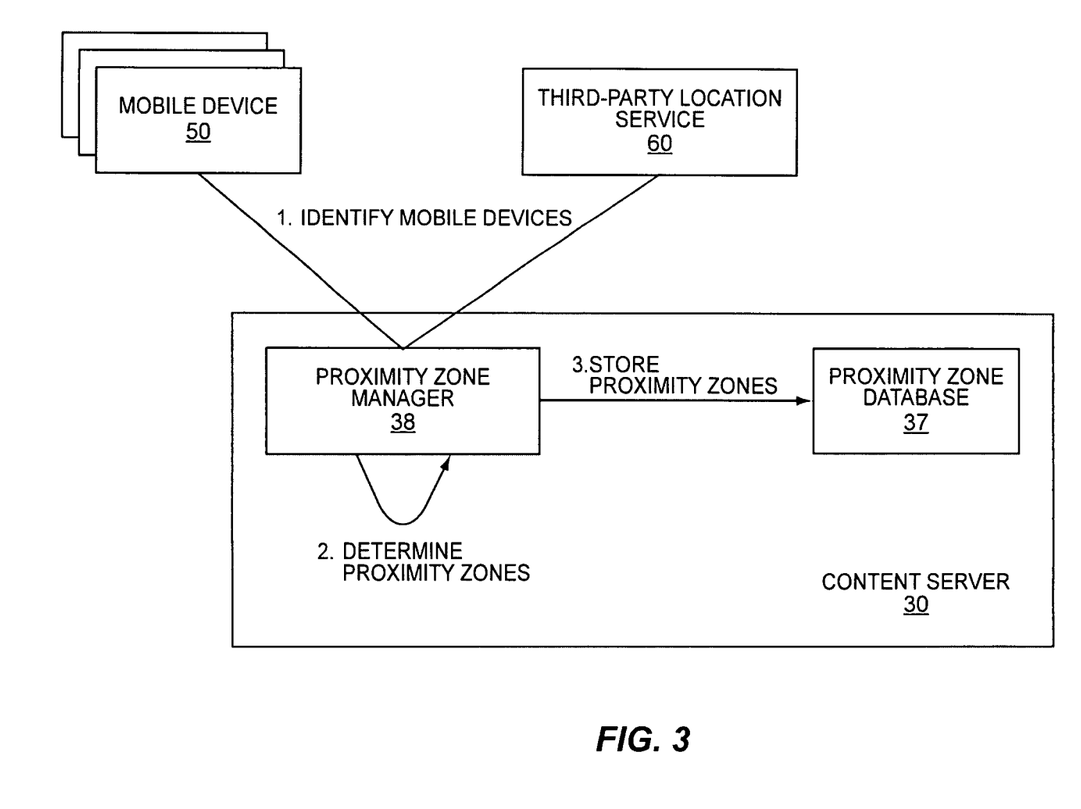
FIG. 3 illustrates the content server dynamically determining the proximity zones.

FIG. 3 illustrates the management of a plurality of proximity zones from the perspective of the content server 30.

The proximity zones can be statically defined for geographical areas and/or dynamically constructed based on a number of factors outlined in more detail below. FIG. 3 illustrates the content server 30 dynamically determining the proximity zones. First, the content server may discover or (1) identify the mobile devices 50 passively via their requests (e.g., they ask for content), or pro-actively by querying devices or asking a third-party location service 60 for a list of nearby devices. Second, the content server 30 then utilizes a proximity zone manager 38 to apply rules that (2) determine how to construct proximity zones based on the mobile devices 50 in proximity or predicted to be in proximity. Third, the content server 30 (3) stores the proximity zone information in the proximity zone database 37 for use when it services user 15 requests.

As far as the creation of proximity zones, for example, the geographic locations for proximity zones may be static—however, the media accessible in a proximity zone can be dynamically determined by the system based on the aggregate of the profiles of user mobile devices 50 in or around the zone. The system may be configured to construct any number of streams or access rules—e.g. based on the aggregate, the system can create "rock", "country", and "easy listening" streams in medium quality. Further details regarding the creation of proximity zones are set forth below.

The process shown in FIG. 3 may execute on a fixed schedule (e.g., every hour), based on a number of mobile devices 50 in a given area, or be triggered manually by an operator. Just as an alternative solution, there may be "generations" of proximity zones. That is, at 8:00 am, the process fills in the particular content that is usable in 5 proximity zones—the information is applicable to the devices that were used to construct that particular content availability—at 8:15 am, the process executes again and it excludes the previously identified mobile devices 50 from the calculations.

The system 10 further allows the place of business to exercise control over the attenuation of the signal by reliably determining the location of potential users and, for example, providing appropriate encryption keys to the users for controlling the quality level of the presentation of the multimedia content for a particular proximity zone.

The system 10 further allows the place of business to control the attenuation or degradation, over distance and direction, of qualities such as but not limited to the following:
(1) Sampling rate,
(2) Access to newly released music,
(3) Duration of the provided musical tracks,
(4) Size of the media catalog provided,
(5) Frequency response,
(6) Maximum volume level,
(7) Run time per track,
(8) Length or rate of advertisement insertions,
(9) Quality of disc jockey (DJ) commentary,
(10) Quality of content matching to personal profile (would be used in, for example, a layered multicast scenario), etc.
Of course, the above list is not exhaustive and those skilled in the art would recognize that other qualities could be attenuated or degraded.

The system 10 is also operative to designate particular zones, such as "dead zones" or "high quality zones". Thus, in particular areas where the place of business does not wish to provide any type of signal at all because a competitor's business is located in that zone, the system 10 designates this area as a dead zone to ensure that customers of the competitor would not receive any of the media content in that area.

On the other hand, a place of business transmitting a signal may have certain premium areas such as areas adjacent to the signal origin at the place of business whereby users in such high quality zones are able to obtain access to the signal by paying, for example, a monthly fee to receive such access. As an example, users in such high-quality zones would have access to encryption keys that correspond to higher sample rates or other forms of increased access to a media library such as music library 35 as shown in FIG. 1.

The present invention also contemplates that the system 10 is operative to allow the place of business which is transmitting the signal to grant individual user-based "upgrades" to the type and quality of proximity access that is allowed in any zone. For example, a user 15 who makes a purchase at the place of business from which the signal is originating may then have access to a higher sample rate and at a greater distance away than another user who has not purchased anything yet from the place of business. This would serve as a type of customer loyalty program.

Of course, such individual user-based upgrades are not limited to the one described above and could likewise be based on, for example, the duration that a user has been in a particular zone. For example, a user who stays in a particular proximity zone for a particular length of time may be granted more access or higher sample rates of media content than a user who just entered the particular proximity zone.

The present invention also contemplates providing some type of indication to the user 15 on, for example, their mobile device 50, in order to apprise the user of any benefits that he will have access to as he moves closer to the target zone or point of origin of the ProximityCast or system 10. For example, the user may be provided with a simple map that currently indicates how the signal is being attenuated the further a particular proximity zone is away from the signal origin at the place of business. Thus, for example, the user 15 would receive on his mobile device 50 the particular portion of the full media library 35 which is available to him based on his distance away from the signal origin at the place of business. The indication could be done in any suitable fashion such as showing more or less bars on the mobile device screen or by showing a dial which indicates the percentage of the music library 35 which is available to the user 15, or the like.

As noted above, in one embodiment, the signal transmitted by the place of business to users in a proximity zone is a content stream. The content stream is streamed to users depending on the encryption key to which they have access and which is directly tied to their actual physical location. As was also noted above, an IPv6 type network environment may be utilized wherein the signals to users in a particular zone is a content stream wherein the content is made available via a multicast stream, allowing multiple users access to the content. Moreover, the multicast may further be layered thus allowing multiple instances of the content at different quality levels available at the same multicast address. In such a case, different encryption keys (based on location) would then be used by various users to gain access to the different quality levels in the layered multicast.

Alternatively, several different multicast streams may be deployed with separate multicast addresses. A unique key would then be required for each multicast based on location. In both of the above-described multicast scenarios, the encryption keys would quickly age out requiring new encryption keys to continue the decryption (i.e., each encrypted stream would constantly be changing its encryption key to keep up with the various users changing locations).

In another embodiment, according to the present invention, the above-described multicast may be made available via unicast circuits. This type of unicast scenario would be beneficial in less dense listener environments (e.g., environments where there is much less pedestrian and/or automobile traffic, or less living units such as apartments, townhouses, etc.). In this embodiment encryption keys could be distributed as in the multicast, example, or the unicast could be initiated based on authenticated location of each user (i.e., not requiring encryption). However, in that case, the device location would need to be continuously monitored to determine when to change the quality of the content.

In another embodiment consistent with the present invention, the media content already resides in the user's device. In this case, the place of business transmitting the signal would utilize the signal to unlock the content and make it usable based on the location of the user 15. Moreover, in this scenario, the user's device would require more security and, since the content is already resident on the user's device, the encryption format cannot change. In this embodiment, for example, a rights expression language (REL) file or entry would be used to control the quality playback of the signal. In order to adjust the quality level, the player may have access to multiple versions of the content, or the player may degrade the quality of a high-quality version to the correct level.

Consistent with the present invention, the system 10 is operative to permit each proximity zone to grant varying levels of access to the media library 35 of the place of business. In that case, the user 15 may simply pick the particular media content they wish to listen to. Alternatively, the system 10 may define which portion of the library is used to conduct a stream, so that the user cannot pick and choose the individual songs, for example, that will actually play over their mobile device 50.

It is also contemplated that the system 10 may query/receive content preferences associated with mobile devices 50 of users 15 in proximity of the place of business and then use that information to determine how to customize various proximity zones. Thus, for example, a particular proximity zone is defined as an aggregate of profiles received, for example, from mobile devices 50 of users, in or nearby a proximity zone. From this, a proximity zone is then created for access/streams to country music because the majority of user devices in that zone prefer that genre of music.

In a further aspect of the customized proximity zone, the system 10 may establish a personalized proximity zone for each particular user 15. For example, a set of personalized proximity zones are established for user 15 that grants that user access to different parts of, for example, media library 35 featuring rock genre. In this regard, the different proximity zones may employ techniques to incentivize users to come closer to the place of business. For example, if a particular user 15 exhibits a profile indicating a preference for rock music, the system 10 may create a series of proximity zones (and indicators) that provide progressively more access to the specific rock bands as the user comes closer to the place of business's actual physical location.

Furthermore, in situations where profile analysis is either inconclusive or unavailable, the system 10 is operative to adapt the definition of each proximity zone based on the usage of the content, streams, etc. For example, the system may start by providing access to a whole range of music genre within a provided music library 35 for each proximity zone, but then later adapt the zone definition to focus on, for example, country genre since that is what a majority of users 15 are currently listening to.

It is still further contemplated that the system 10 can adapt the number of zones and zone definitions (e.g., shape, capabilities, content, etc.) of each zone based on the density of devices in the zone and time of day. For example, at five o'clock in the morning, very few users having mobile devices are nearby the business entity originating the signal. As a result, the system 10 establishes one proximity zone that provides high quality access to all of its content streams. Later on in the day, for example, at 8 am when a larger number of users having mobile devices are present in the area, the system 10 may split the working area into several proximity zones with progressively better quality access, etc., in a direction leading closer to the place of business originating the signal.

The present invention further contemplates that the system 10 can track and project the movement of the user's mobile device 50 to determine how to define and adapt proximity zones. For example, a user 15 having a mobile device 50 is projected to walk tangentially through a working area in which the proximity zones can be constructed. The system 10 is operative to adapt the proximity zones for that particular user 15 such that the proximity zones are shaped with respect to the mobile device's path. In addition, the system 10 keeps track of the user's mobile device 50 information so that it can distinguish between new mobile devices and mobile devices which the system has previously identified. This allows the system 10 to construct more enticing proximity zones for new users.

EXAMPLE

A Proximity Encrypted ProximityCast (e.g., system 10) of a Music Library from a Commercial Café Location With reference to FIG. 4, a commercial café C located on the corner of Riverside and West $28^{th}$ Street in Richmond, Va., wants to provide its customers with "proximity based access" to a comprehensive, easy-listening and properly licensed music library 35 (see FIG. 1). The commercial café C is represented by the circular object in FIG. 4. The commercial café C will use the proximity based access as an inducement to those customers equipped with a suitable music related music device such as mobile device 50 to enter their location and purchase coffee, food, etc. While FIG. 4 illustrates the proximity zones having ever-increasing concentric circles as you move away from the commercial café C, the present invention is not limited to such a configuration. For example, the proximity zones may have any type of geometric shape, and can be a set of non-contiguous geometric shapes for a proximity zone. Moreover, a proximity zone can also be three-dimensional, e.g., the first story of a building next-door to the commercial café C contains shops and is included in a proximity zone, but the floors above it have offices and are not included in the proximity zone.

The commercial café C also wants to provide some portion (e.g., attenuated portion) of the music library 35 to potential customers that are in the surrounding area. For example, such an attenuated portion of the music library 35 could be provided to those visitors to the section of Riverside Park P shown just to the north of the commercial café location C and who may be possibly induced to visit the commercial café location C.

The commercial café location C would further like to control the type and degree of the attenuation of the media content available based on the user's relative proximity to the location. In that way, nearby users would get some value from being near the location, but would get a greater value by actually going to the location of the commercial café C.

The system 10 allows the commercial café C to control the intentional attenuation/degradation/availability of their signal in the surrounding area depending on distance (and direction) from the signal origin. The attenuation can take the form of decreasing sample rates for the tracks in the library, decreasing the size of the available library, decreasing durations for the musical tracks provided, etc., or any combination of these factors (see also the non-limiting list of qualities set forth above).

As shown in FIG. 4, the commercial café location C is managing the sample rate of the music that will be provided to users in proximity zones surrounding the location. As noted above, the commercial café location C is represented by the circular object in the center. For any individual proximity zone, the location has extremely fine-grained control over other qualities like track duration, maximum volume, rate of ad insertions, quality of profile matching, etc.

With the settings for sample rates, as users in the surrounding area move further from the location, the system can verify their location and then provide those users with particular encryption keys that are associated with the appropriate proximity zone.

As is also shown in FIG. 4, the location of the commercial café C has additionally utilized the proximity zone interface to create a dead zone for their signal. Thus, no encryption key will be provided for this area, such that the music library will be unavailable in that sector. The circular object on Hillcrest Road represents a competitor café location R for which the commercial café location C does not want to provide any access or service to their music library 35.

Figure 5:
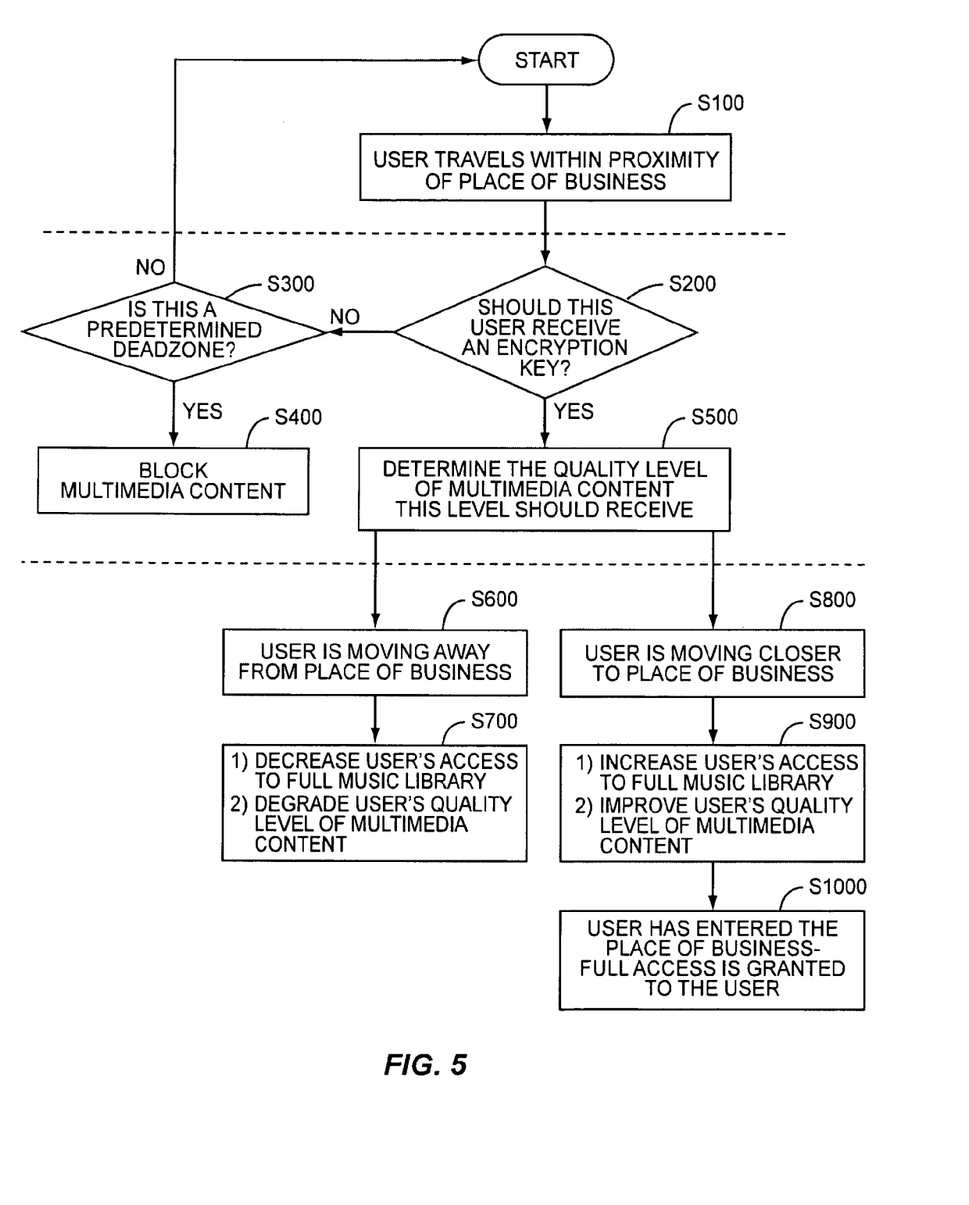
FIG. 5 is a flow chart that illustrates the operation of the method and system for providing proximity-based quality for multimedia content according to an exemplary embodiment of the present invention.

FIG. 5 is a flow chart that illustrates the operation of the method and system for providing proximity-based quality for multimedia content according to an exemplary embodiment of the present invention. To begin, a user 15 travels within proximity of a place of business, for example, from the commercial café C as discussed above (step S100). The system 10 determines whether this particular user 15 should receive a license/encryption key (step S200). If the system 10 determines that this user 15 should not receive an encryption key, the system then determines whether the proximity zone is a predetermined dead zone, such as, where a competitor's location R exists (step S300). If the user is in a predetermined dead zone, then the system intentionally blocks the multimedia content (step S400). This would occur in the dead zone occupied by a competitor's location R wherein the commercial café C wishes to avoid transmitting their multimedia content to the competitor's location R. If the user is determined not to be within the dead zone, the system will again determine whether the user 15 should receive the key and possibly block the key if there is some other reason for not granting access.

While step S400 refers to intentionally blocking the multimedia content, the present invention is not limited to this configuration. Alternatively, the system 10 could be operative to prevent the mobile device 50 from using the content stream. For example, the system 10 may operate to change encryption keys on a periodic interval, and the mobile device 50 in the dead zone would not be provided with the updated key(s).

If the user is determined to be in a proper proximity zone and thus should receive an encryption key, the system 10 next determines what quality level of multimedia content the user 15 should receive (step S500). If the user 15 is moving closer to the commercial café location (step S800), then the system 10 is operative to, for example, increase the user's access to the full music library, improve the quality of the presentation of the multimedia content, etc. (step S900). Once the user 15 has actually entered the commercial location, full access to the multimedia content is granted to the user 15 (step S1000).

On the other hand, if the user is determined by the system to be moving further from the commercial location (step S600), then the system 10 is operative to, for example, decrease the user's quality level of the multimedia content by intentionally attenuating the presentation quality, etc. (step S700).

In the example shown in connection with FIG. 4, the commercial café location C not only decreases the sampling rate as user's 15 move further away from the store itself, but also decreases the portion of the full music library 35 that an individual user 15 can see (also based on the user's physical proximity to the store). In this regard, users 15 may be provided with a simple, graphic means on their mobile devices 50, for example, smart phones, to understand what "quality" of the multimedia content they will receive, depending on their proximity to the store. As discussed above, such graphical means can be in the form of a map similar to what is shown in FIG. 4, a number of bars, a dial showing from zero to 100 percent of the available library, or any other suitable indication devices to show the user the quality of the multimedia content they will receive, or the amount of access to the music library 35 to which the user will be granted access.

As was noted above, an aspect of the present invention is to incentivize end users 15 to come closer to the center of the proximity zones, i.e., the area where the greatest value is available, such as in the café. In this regard, the system 10 may provide end users 15 an indication (visible or audible or both) that moving into another zone will provide some benefit, and that moving to the center zone will provide the greatest benefit.

Figure 6:
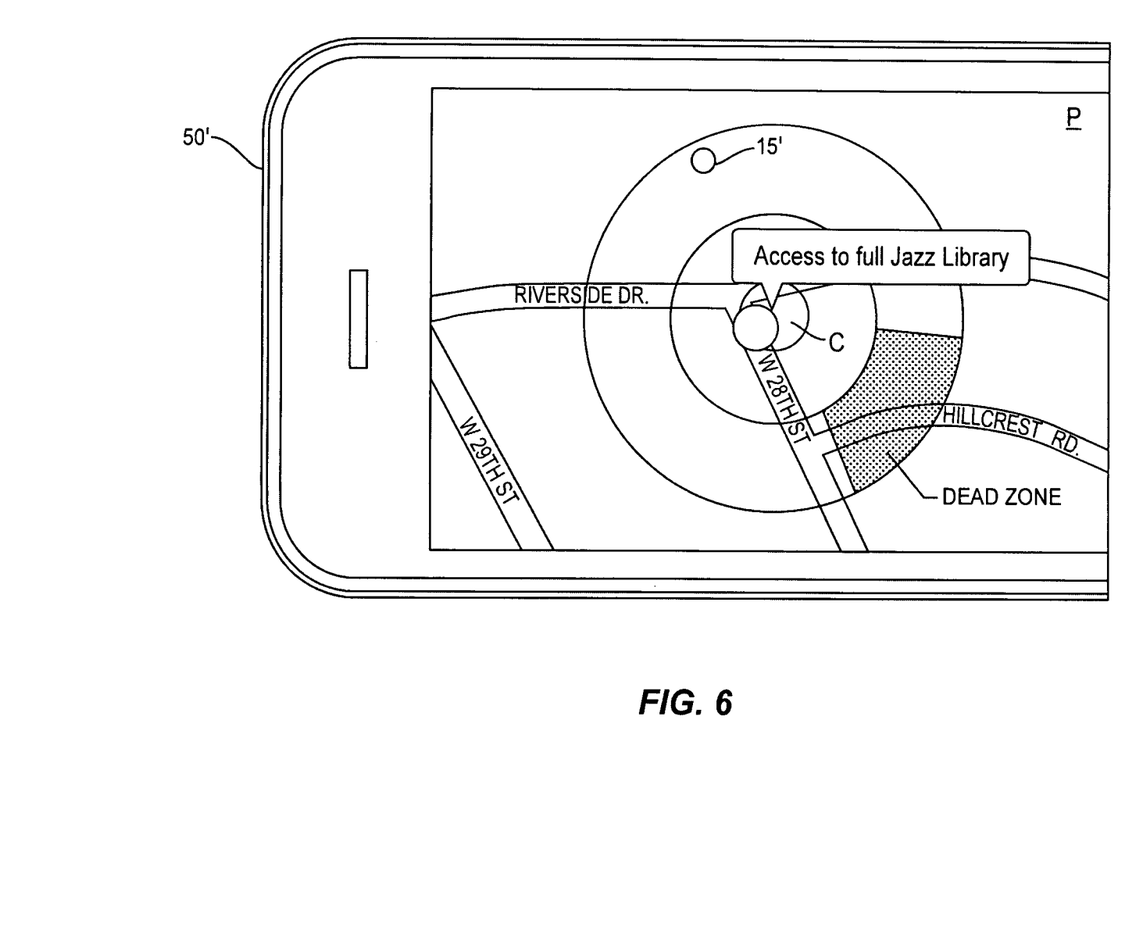
FIG. 6 illustrates a proximity zone map on a user's mobile device according to an exemplary embodiment of the present invention.
Figure 7:
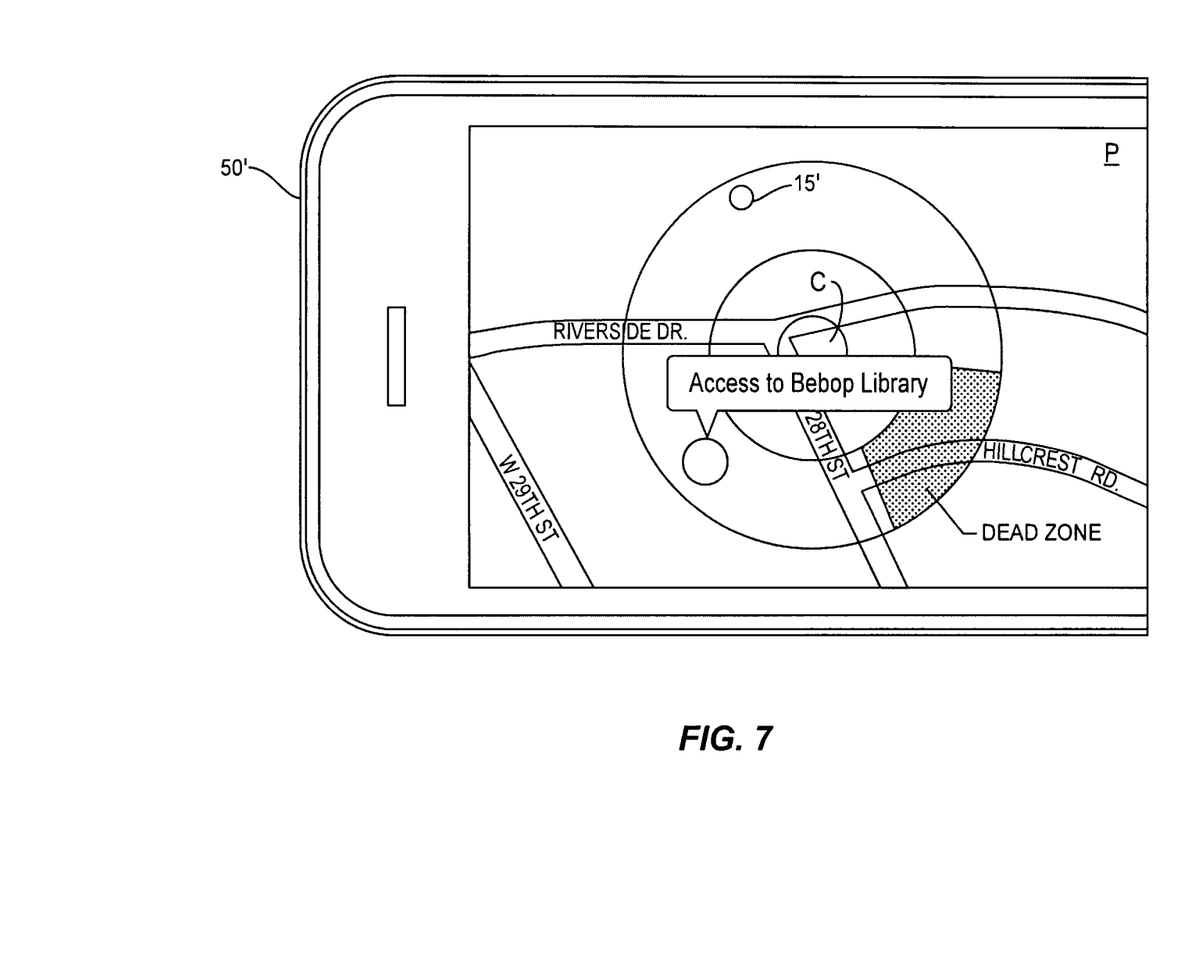
FIG. 7 illustrates another proximity zone map on a user's mobile device according to an exemplary embodiment of the present invention.

For example, in the "proximity-zone enabled" commercial café location next to the park as shown in FIG. 5, an end user 15 might see a visible indicator or alert on their handheld mobile device 50 of what benefits the proximity zones around him will provide. There are many ways to represent this to the user 15 and one of these is illustrated in FIGS. 6 and 7. An alternative embodiment of this could be an audible indicator that the user is getting "warmer" or "cooler" in respect to the values provided in the related zones. Perhaps the user 15 would receive an audible introduction by the system when they enter each zone and an audible indicator that they are moving closer to the center zone—along with an indication of what benefit that will provide.

An exemplary use case for a visible indication of the zones:
1. As shown in FIGS. 6 and 7, a user 15' is looking at a map display of the area he is currently in using his networked handheld device 50'—the user 15' is represented by the small circle at the upper left.
2. The system 10 has overlaid a set of visible proximity zones surrounding the cafe's C location on the map, and each of these zones represent the kind and size of the media library this user will have access to in each zone.
3. The system 10 has created a custom set of proximity zones for this user based on the user's 15' profile—this user is interested in Jazz and so the system has tailored the zones to especially appeal to this user 15'.
4. As the user 15' clicks on each of the zones, the system 10 indicates what kind of signal is available in that area.
5. When the user 15' clicks on the zone immediately surrounding the café C, he sees that in that zone he will have access to the "full Jazz library" (see FIG. 6).
6. When the user 15' clicks on the yellow proximity zone (the zone furthest away from the center of the zones and the zone he is currently in) the user 15' sees that he will have access only to a part of the library—Bebop (a subset of the Jazz Library) (see FIG. 7).

7. Similarly, the other zones indicate which portions of the library are available to him in those zones when the user 15' clicks on them.

The present invention has substantial opportunity for variation without departing from the spirit or scope of the present invention. For example, while the embodiments discussed herein are directed to media content in the form audio content such as music, the present invention is not limited thereto and could be implemented with other media content such as video content.

Those skilled in the art will recognize improvements and modifications to the preferred embodiments of the present invention. All such improvements and modifications are considered within the scope of the concepts disclosed herein and the claims that follow.

What is claimed is:

1. A method of providing proximity-based quality for multimedia content, comprising:
    transmitting the multimedia content; and
    intentionally controlling a quality level of a presentation of the multimedia content based on geographic proximity of a user to a particular location including intentionally controlling the quality level of the presentation of the multimedia content in accordance to a defined quality level for a one of a plurality of geographic proximity zones associated with the particular location and comprising a first geographic proximity zone having a first defined quality level, a second geographic proximity zone having a second defined quality level that is less than the first defined quality level, and a third geographic proximity zone, wherein intentionally controlling the quality level is conducted with respect to at least one of a sampling rate, a duration of the same provided musical tracks, a frequency response, a length of advertisement insertions, and a rate of advertisement insertions.

2. The method of claim 1, wherein the multimedia content is carried as a digital signal.

3. The method of claim 2, wherein the multimedia content is music.

4. The method of claim 2, wherein the digital signal is sent over a wireless network.

5. The method of claim 1, wherein a degree of controlling of the quality of the multimedia content is increased such that the quality level of the presentation of the multimedia content is degraded as the user moves further from the particular location.

6. The method of claim 1, wherein a degree of controlling of the quality of the multimedia content is reduced as the user moves closer to the particular location, with the user receiving a full quality level of the presentation of the multimedia content at the particular location.

7. The method of claim 1, wherein the intentional controlling of the quality of the multimedia content includes creating a dead zone wherein the multimedia content is completely blocked from the user.

8. The method of claim 7, wherein the dead zone represents an area surrounding a competitor's place of commercial business.

9. The method of claim 1, further comprising customizing a proximity zone for receiving the multimedia content in order to establish a personalized proximity zone for each particular user.

10. The method of claim 1, wherein the multimedia content is a content stream which is streamed to the user depending on an encryption key to which the user has access and which is directly tied to the user's actual physical location.

11. The method of claim 10, wherein a content of the content stream is made available via a multicast stream thereby to allow multiple users access to the content.

12. The method of claim 1, wherein the multimedia content is transmitted from the particular location.

13. The method of claim 1, wherein the particular location is a commercial place of business.

14. The method of claim 1, wherein the intentional controlling is conducted with respect to the sampling rate.

15. The method of claim 1, wherein the intentional controlling is conducted with respect to the duration of the same provided musical tracks.

16. The method of claim 1, wherein the intentional controlling is conducted with respect to the frequency response.

17. The method of claim 1, wherein the intentional controlling is conducted with respect to the length of advertisement insertions.

18. The method of claim 1 wherein the intentional controlling is conducted with respect to the length of advertisement insertions or the rate of advertisement insertions.

19. The method of claim 1, wherein the first geographic proximity zone is closer than the second geographic proximity zone and the third geographic proximity zone to a particular location and the second geographic proximity zone is closer to the particular location than the third geographic proximity zone.

20. A system for providing proximity-based quality for multimedia content, comprising:
    means for transmitting the multimedia content; and
    means for intentionally controlling a quality level of a presentation of the multimedia content based on geographic proximity of a user to a particular location including intentionally controlling the quality level of the presentation of the multimedia content in accordance to a defined quality level for a one of a plurality of geographic proximity zones associated with the particular location and comprising a first geographic proximity zone having a first defined quality level, a second geographic proximity zone having a second defined quality level that is less than the first defined quality level, and a third geographic proximity zone, wherein intentionally controlling the quality level is conducted with respect to at least one of a sampling rate, a duration of the same provided musical tracks, a frequency response, a length of advertisement insertions, and a rate of advertisement insertions.

21. The system of claim 20, wherein the multimedia content is carried as a digital signal.

22. The system of claim 21, wherein the multimedia content is music.

23. The system of claim 16, wherein the digital signal is sent over a wireless network.

24. The system of claim 20, wherein a degree of controlling of the quality of the multimedia content is increased such that the quality level of the presentation of the multimedia content is degraded as the user moves further from the particular location.

25. The system of claim 20, wherein a degree of controlling of the quality of the multimedia content is reduced as the user moves closer to the particular location, with the user receiving a full quality level of the presentation of the multimedia content at the particular location.

26. The system of claim 20, wherein the intentional controlling of the quality of the multimedia content includes means for creating a dead zone wherein the multimedia content is completely blocked from the user.

27. The system of claim 26, wherein the dead zone represents an area surrounding a competitor's place of commercial business.

28. The system of claim 20, further comprising means for customizing a proximity zone for receiving the multimedia content in order to establish a personalized proximity zone for each particular user.

29. The system of claim 20, wherein the multimedia content transmitted from the transmitting means is a content stream which is streamed to the user depending on an encryption key to which the user has access and which is directly tied to the user's actual physical location.

30. The system of claim 29, wherein a content of the content stream is made available via a multicast stream thereby to allow multiple users access to the content.

31. The system of claim 20, wherein the multimedia content is transmitted from the particular location.

32. The system of claim 20, wherein the particular location is a commercial place of business.

33. A non-transitory computer readable medium comprising software for instructing a system to:
transmit multimedia content; and
intentionally control a quality level of a presentation of the multimedia content based on geographic proximity of a user to a particular location including intentionally controlling the quality level of the presentation of the multimedia content in accordance to a defined quality level for a one of a plurality of geographic proximity zones associated with the particular location and comprising a first geographic proximity zone having a first defined quality level, a second geographic proximity zone having a second defined quality level that is less than the first defined quality level, and a third geographic proximity zone, wherein intentionally controlling the quality level is conducted with respect to at least one of a sampling rate, a duration of the same provided musical tracks, a frequency response, a length of advertisement insertions, and a rate of advertisement insertions.

34. The computer readable medium of claim 33, wherein the multimedia content is carried as a digital signal.

35. The computer readable medium of claim 34, wherein the multimedia content is music.

36. The computer readable medium of claim 34, wherein the digital signal is sent over a wireless network.

37. The computer readable medium of claim 33, wherein a degree of controlling of the quality of the multimedia content is increased such that the quality level of the presentation of the multimedia content is degraded as the user moves further from the particular location.

38. The computer readable medium of claim 33, wherein a degree of controlling of the quality of the multimedia content is reduced as the user moves closer to the particular location, with the user receiving a full quality level of the presentation of the multimedia content at the particular location.

39. The computer readable medium of claim 33, wherein the intentional controlling of the quality level of the multimedia content includes creating a dead zone wherein the multimedia content is completely blocked from the user.

40. The computer readable medium of claim 39, wherein the dead zone represents an area surrounding a competitor's place of commercial business.

41. The computer readable medium of claim 33, wherein the software is further operative to instruct the system to customize a proximity zone for receiving the multimedia content in order to establish a personalized proximity zone for each particular user.

42. The computer readable medium of claim 33, wherein the multimedia content is a content stream which is streamed to the user depending on an encryption key to which the user has access and which is directly tied to the user's actual physical location.

43. The computer readable medium of claim 42, wherein a content of the content stream is made available via a multicast stream thereby to allow multiple users access to the content.

44. The computer readable medium of claim 33, wherein the multimedia content is transmitted from the particular location.

45. The computer readable medium of claim 33, wherein the particular location is a commercial place of business.

46. The computer-readable medium of claim 33 wherein the first geographic proximity zone is closer than the second geographic proximity zone and the third geographic proximity zone to a particular location and the second geographic proximity zone is closer to the particular location than the third geographic proximity zone.

47. A method of providing proximity-based quality for multimedia content, comprising:
transmitting the multimedia content;
intentionally controlling a quality level of a presentation of the multimedia content in accordance to a defined quality level for a one of a plurality of geographic proximity zones comprising a first geographic proximity zone having a first defined quality level, a second geographic proximity zone having a second defined quality level that is less than the first defined quality level, and a third geographic proximity zone having a third defined quality level that is less than the second defined quality level.

48. The method of claim 47, wherein the first geographic proximity zone is closer than the second geographic proximity zone and the third geographic proximity zone to a particular location and the second geographic proximity zone is closer to the particular location than the third geographic proximity zone.

49. A non-transitory computer readable medium comprising software for instructing a system to:
transmit multimedia content;
intentionally control a quality level of a presentation of the multimedia content in accordance to a defined quality level for a one of a plurality of geographic proximity zones comprising a first geographic proximity zone having a first defined quality level, a second geographic proximity zone having a second defined quality level that is less than the first defined quality level, and a third geographic proximity zone having a third defined quality level that is less than the second defined quality level.

50. The non-transitory computer readable medium of claim 49, wherein the first geographic proximity zone is closer than the second geographic proximity zone and the third geographic proximity zone to a particular location and the second geographic proximity zone is closer to the particular location than the third geographic proximity zone.

* * * * *